United States Patent
Pit Rada

(10) Patent No.: US 10,339,626 B2
(45) Date of Patent: Jul. 2, 2019

(54) METHOD FOR PRODUCING FRAMING INFORMATION FOR A SET OF IMAGES

(71) Applicant: FotoNation Limited, Galway (IE)

(72) Inventor: Cosmin Pit Rada, Bucharest (RO)

(73) Assignee: FotoNation Limited, Galway (IE)

( * ) Notice: Subject to any disclaimer, the term of this patent is extended or adjusted under 35 U.S.C. 154(b) by 182 days.

(21) Appl. No.: 15/630,744

(22) Filed: Jun. 22, 2017

(65) Prior Publication Data

US 2018/0374191 A1   Dec. 27, 2018

(51) Int. Cl.
  *G06T 3/00* (2006.01)
  *G06T 7/11* (2017.01)
  *G06T 7/136* (2017.01)
  *G06T 7/194* (2017.01)
  *G06T 7/174* (2017.01)

(52) U.S. Cl.
  CPC .............. *G06T 3/0006* (2013.01); *G06T 7/11* (2017.01); *G06T 7/136* (2017.01); *G06T 7/174* (2017.01); *G06T 7/194* (2017.01); *G06T 2207/10016* (2013.01)

(58) Field of Classification Search
  None
  See application file for complete search history.

(56) References Cited

U.S. PATENT DOCUMENTS 5,848,198 A * 12/1998 Penn ................... G06T 7/0012
  382/276
2018/0374191 A1* 12/2018 Pit Rada ............. G06T 3/0006

* cited by examiner

*Primary Examiner* — Iman K Kholdebarin

(57) ABSTRACT

A method for producing framing information for a set of N source images, each comprising an object region R, comprises scaling, translating and/or rotating images of the source images so that the object region is aligned. For a given image of the object aligned source images, at a given frame size, a given frame angle for a frame relative to the object aligned images and at a first candidate boundary position for the frame, the method determines if there is at least one position for a second boundary of the frame orthogonal to the first boundary where the frame lies within the image and the frame encloses the object region. If so, counters associated with the first candidate boundary position are incremented. Responsive to any counter meeting a threshold value, K≤N, for the source images, framing is indicated as possible at the given frame size, frame angle, first candidate boundary position and any position for the second boundary associated with the threshold meeting counter. Otherwise, another image can be chosen and the process repeated.

13 Claims, 4 Drawing Sheets

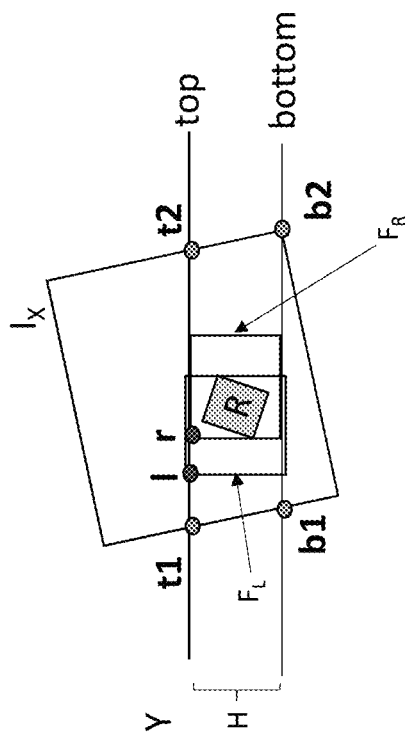
Figure 2
Figure 3
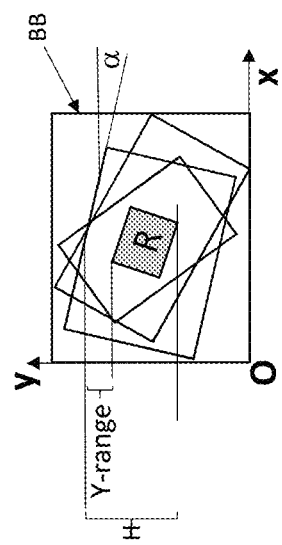
Figure 4
Figure 5

METHOD FOR PRODUCING FRAMING INFORMATION FOR A SET OF IMAGES

FIELD

The present invention relates to a method for producing framing information for a set of images.

BACKGROUND

Time-lapse photography is a technique whereby the frequency at which film frames are captured is much lower than that used to view the sequence. When played at normal speed, time appears to be moving faster and thus lapsing.

In the past, time-lapse photography had employed a static camera position so that the background for a subject could be static and so a slowly changing subject could be readily viewed in a short period of time.

With the advent of hand-held image capture devices, it became desirable to produce time-lapse image sequences where the original background as well as the subject may have varied or moved within the captured images forming the sequence.

Instagram Hyperlapse is an application employing image stabilization techniques to smooth background movement within a scene as far as possible while a subject moves within the scene.

On the other hand, many users of mobile devices having front facing cameras routinely capture "selfie" images and wish to generate a time-lapse image sequence which maintains the subject, their face, at as large a size as possible and with the same location through the image sequence—while at the same time maintaining as much background imagery as possible so that the changing context for the subject can be appreciated.

These conflicting goals can make the computation required to process a set of source images with a mobile device to determine the optimal framing for images within a set of framed images unfeasibly onerous, especially when a large set of source images required to produce an interesting time-lapse image sequence may also contain a variety of images not necessarily conforming to the framing of other images or indeed not containing the same subject.

SUMMARY

According to the present invention, there is provided a method for producing framing information for a set of images according to claim 1.

The method provides framing information for a set of images enabling, for example, the creation of a video montage with smooth transitions using a morphing algorithm.

The framing information can also be used in other applications where stitching of component images to provide a synthesized image may be required and where component images contain a readily detected subject where it is required to reconstruct information around the subject from multiple images.

Embodiments of the method are flexible and provide various tuning parameters, for example: a percentage of source images which should be employed for the set of framed images (P), a discard factor (f), a range of scanning angles (A). Thus, if speed is needed, it is possible to trade quality against speed, by choosing a higher discard factor, f, or lower P.

In some embodiments, a set of source images can be downscaled prior to processing.

BRIEF DESCRIPTION OF THE DRAWINGS

An embodiment of the invention will now be described, by way of example, with reference to the accompanying drawings, in which:

FIG. 2 illustrates a set of images I aligned around an object region R;

FIG. 3 illustrates potential framing for two images with a differently located object region R;

FIG. 4 illustrates the set of images of FIG. 2 rotated according to a potential framing angle α;

FIG. 5 illustrates a potential range of X locations for a frame at a given candidate Y location;

DESCRIPTION OF THE EMBODIMENT

Figure 1:
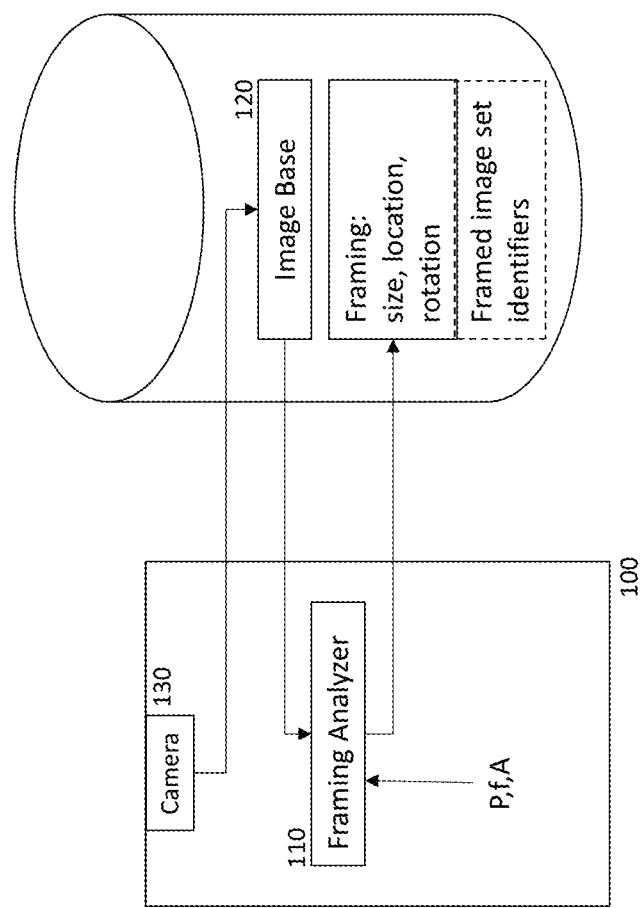
FIG. 1 illustrates an image acquisition device including a framing analyzer according to an embodiment of the present invention.

Referring now to FIG. 1, there is shown an image acquisition device 100 including a framing analyzer 110 according to an embodiment of the present invention. The framing analyzer 110 implements a method for producing framing information for a set of source images stored in an image base 120. The image base 120 can either be local to the device 100 or the image base 120 can be remote, for example, cloud based storage or a combination of both. In the example, the framing analyzer 110 is implemented on a device which includes at least one camera 130 contributing images to the image base 120. As discussed, the camera can comprise a front camera of the type typically employed to acquire selfie images and/or a rear camera. The analyzer 110 typically cooperates with or forms a component of an application which uses the framing information for subsequent processing of the set of source images, for example, to produce a time-lapse image sequence.

The framing information produced by the analyzer 110 can, for example, comprise: a frame size, a location of the frame relative to an object region R within the source images, and a rotation angle of the frame relative to the object region R.

Referring now to FIG. 2, the method begins by identifying a set of N source images, $I_1, I_2, \ldots I_N$ in the image base 120 each of them containing the common object or subject region that can be approximated by a rectangle R, not necessarily axis aligned. The set of source images can be identified in any number of ways from a user manually grouping such images together in one or more directories or by a user selecting a first image including an exemplar of the object and then automatically searching local and/or remote directories for other images containing the same object.

Note that while the embodiment is described in terms of an object bounded by a rectangle R, it will be appreciated that the method is applicable to any shape which can bound an object.

Embodiments assume that it is acceptable to translate, rotate and scale any image within the set of source images as required to produce a framed image, but without leaving portions of a background blank in any framed image. Thus, while in FIG. 2 source images, $I_1, I_2, \ldots I_N$, are shown as approximately the same size when they are translated, rotated and scaled to align the object region within the images, this is not necessarily the case for a set of source images.

In any case, embodiments of the present invention try to find the biggest rectangular region, frame, for example as indicated by the rectangle F, having a given aspect ratio, that encloses the common object region R and that is also fully contained in at least a given portion of the set of source images.

FIG. 3 shows that it is very likely by choosing images in which the common object is in different places in source images to lower the amount of background framing the object in the framed set of images. Since the set of sources images might be quite large, it might be the case that some of the images will have the common object in about the same relative position, let's say in the top-left corner, whilst others will have the object in the bottom-right corner.

In the case of FIG. 2, the rectangle F represents a possible framing, if it is permissible to discard at most 1 image—in this case $I_N$. On the other hand, if a requirement that no picture should be discarded is imposed, it will be seen that the potential framing would be much tighter to the object R, having almost no other content than the object itself. Indeed, the more source pictures used, the tighter the framing of the object within the framed set would tend to be.

Thus embodiments of the present invention are based on discarding a portion of source images when selecting images for the framed set of images.

However, choosing which images to discard in order to obtain the largest frame F is not simple. As mentioned, a brute force method trying every subset of the original source set of images would be too slow or processor intensive in most cases, especially if this were to be performed in a mobile device.

Embodiments of the present application establish a target percentage or proportion P of the set of N source images which it is desired to include in a set of framed images.

While the size of any given framed image will vary according to the scaling to be applied to the framed image, the aspect ratio is known. Thus, knowing a candidate frame's width W, its height H can be determined.

Figure 6:
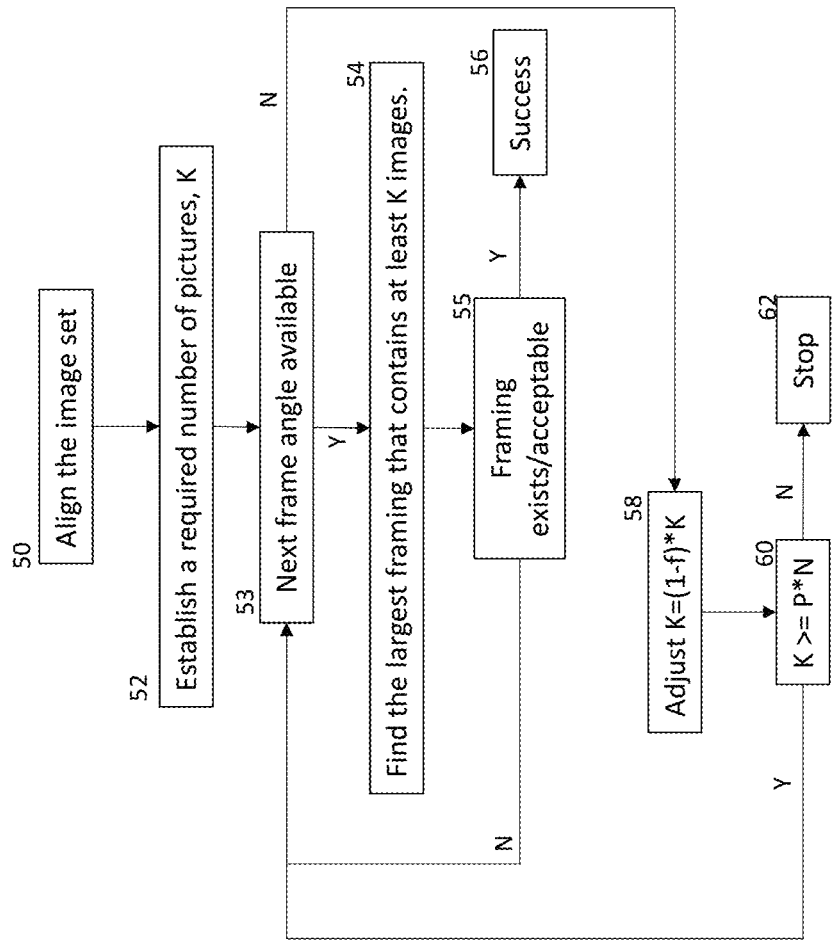
FIG. 6 illustrates generally a method for producing framing information for a set of images according to an embodiment of the present invention.

Referring now to FIG. 6, the method is illustrated in more detail:

At step 50, a scaling and rotation is determined for each source image to bring the rectangle R bounding the object of interest within each image to the same size and alignment—essentially enabling images to be organized as shown in FIG. 2. In order to do so, any source image, for example $I_1$ can be chosen as a reference image and the scaling and rotation chosen for the remaining images accordingly. This scaling and rotation can also involve downscaling to reduce the processing or memory requirements to perform the steps described below. In this case, if the original images are to be used in processing using the framing determined for the set of source images, then a record will need to be maintained of the scaling required so that this can be used to map the framing information back to the original source image. (The framing angle can be defined relative to the object region R rather than the image frame and so can be independent of the rotation required to produce the alignment of FIG. 2.)

At step 52 a required number of pictures K for the set of framed images is chosen. Initially K=N, the number of images in the set of source images.

The method now loops through a range of angles (A) of rotation of the object region R relative to the x (or y) axis and at each angle attempts to find the largest framing containing at least K images, step 54—this step will be explained in more detail in relation to FIG. 7. The order of angles within the range of angles A chosen at step 53 can be intelligent, in that the order can start on the assumption that most selfies are taken with the subject upright most likely in a portrait image, less likely in a landscape image and subsequently at angles close to upright in either portrait or landscape images. Thus, the sequence of angles chosen might be 0° (portrait), 90° (landscape), 5°, 85°, −5°, 95°, etc. . . . This approach assumes that inverted portrait or landscape images are flipped so that the subject appears generally in the same orientation in both image formats—otherwise the angles chosen might need to be 0° (portrait—upright), 90° (landscape—left), 270° (landscape—right), etc. . . . The range of angles need not be continuous ranges and indeed the range and sequence of angles chosen may be learned, either from results gained from a given user or result taken from many users.

Step 55 tests if such a framing exists and if the framing is acceptable—for example, testing if the framing is regarded as being wide enough around the region R. If so, the method can stop and indicate success, step 56 and if not, the method continues until the range of angles has been completely tested and/or a more acceptable framing is determined.

Thus, even if step 55 indicates framing is acceptable, variants of the method could continue to check for acceptable framing at other angles and then select between different framing solutions based on either algorithmic criteria or in response to user interaction where a user selects between framing options.

If no further angles are available and framing has not yet been successful, the required number is reduced according to a fraction f, step 58.

If K remains greater than a percentage (P) of source images (N) which should be employed for the set of framed images, step 60, the process can continue, but otherwise, the process stops either with a fail indicator or providing the best framing achieved for the range of angles A, step 62.

Figure 7:
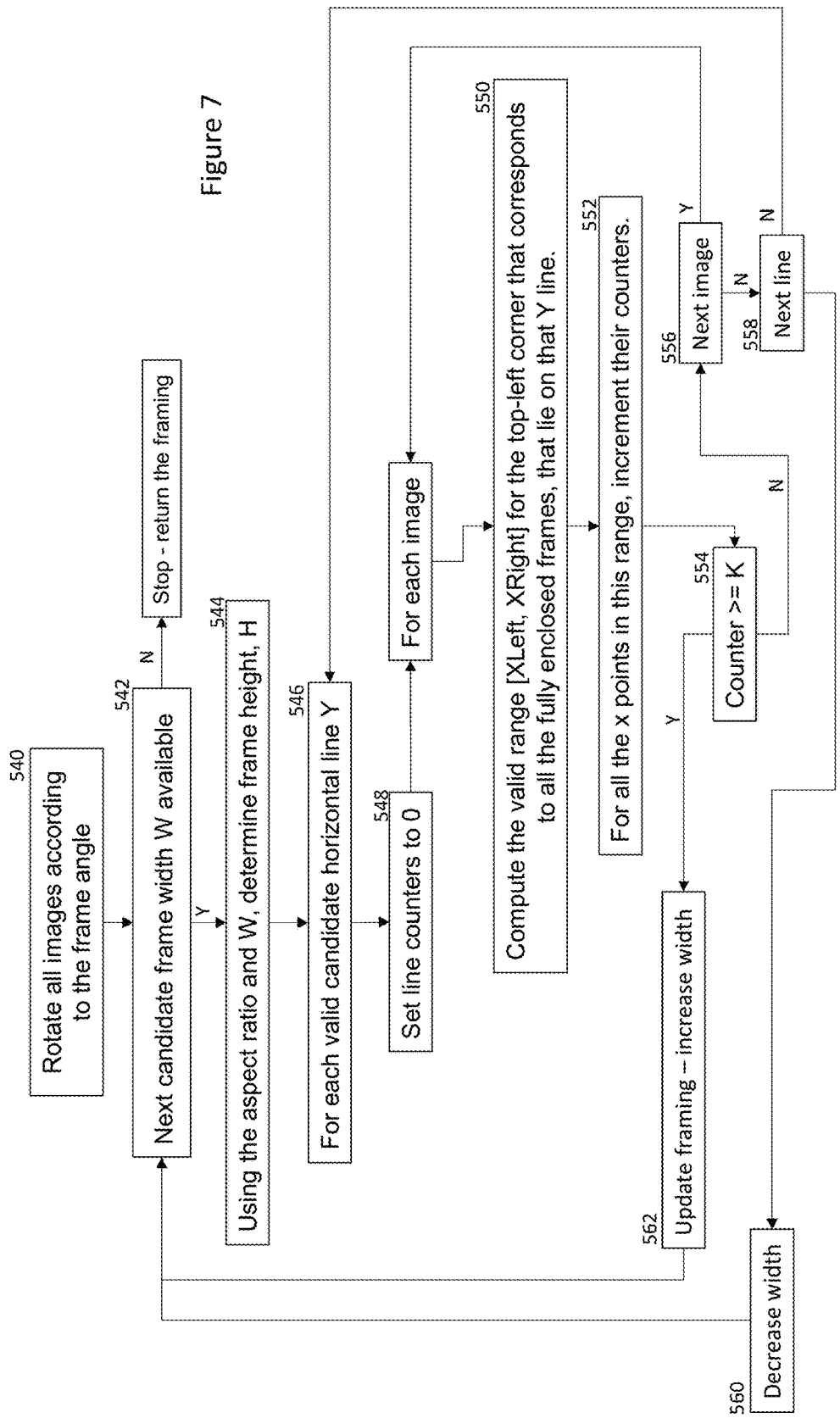
FIG. 7 illustrates a method for determining if framing is possible at a given frame angle according to an embodiment of the present invention.

Referring now to FIG. 7 which illustrates the operation of step 54 above in more detail. This operation ultimately determines the speed of the method for finding the largest frame, with a given orientation angle of the object region R and K, the minimum number of images that should be used.

The operation begins at step 540 by rotating all of the images according to the frame angle chosen at step 53. FIG. 4 shows the set of images in FIG. 2 rotated by an angle α vis-à-vis the base orientation illustrated in FIG. 2. (Note that in this base orientation, the object region may be off axis and this may need to be taken into account when processing source images with the framing information subsequently.) For simplicity and to avoid using negative indices, the entire image set is translated, such that it will end up in the first quadrant, and tangent to the x, y axes as shown in FIG. 4.

At step 542, a candidate frame width is chosen. The range for the frame width resulting from framing is from a maximum, potentially corresponding to the width of the widest image in the set of source images after scaling, to a minimum, corresponding to the object region width used for scaling. Again, some intelligence can be applied to this range knowing that for example, a frame width corresponding to the object region width is more than likely going to be successful, but not acceptable as it would contain minimal background. So the minimum width might be chosen as the object region width multiplied by a percentage such as 10%.

Similarly, it might be appreciated that the width of the widest image in the set of source images after scaling might never be successfully chosen, and so this could be reduced by 10% or even the width of the Xth narrowest image in the set of source images after scaling could be chosen as the maximum width.

The method of FIG. 7 attempts to identify a maximum width W for framing a set of at least K images using a binary search. Thus, the first candidate width chosen might be chosen as halfway between the minimum and maximum widths. If this is successful then a greater candidate frame width can be chosen for the next iteration, and, if not, a narrower frame width can be chosen for the next iteration and so on—the change in frame width halving with each iteration, until the final width is chosen either from the last or last minus one iteration of the loop depending on which is successful.

Now at step 544, a candidate frame height H is determined based on the candidate frame width W and maintaining the aspect ratio of the original set of source images. (If the source images vary in aspect ratio, for example, including some portrait and some landscape images, then an aspect ratio can be selected by the user or the method can run through multiple iterations of the method for a plurality of aspect ratios.)

Now as will be seen from FIG. 4, a bounding box BB can be defined so that it extends across each of the scaled, rotated and translated images.

The goal is to determine if intersecting areas of at least K scaled, rotated and translated images extend across a region of the bounding box of at least the chosen width W and height H—if so the method will deem that framing at that orientation of the set of source images relative to the candidate framing is possible.

In the embodiment, the method does this by determining a range of x locations of a candidate framing F beginning at a candidate Y position for a top border of a frame within each image.

Referring to FIG. 4, it will be seen that for any given frame height, there may only be a limited range of Y positions for the top border of a frame as the frame needs to extend at least past the bottom corner of the object region R.

In any case, beginning at a first candidate horizontal line Y, step 546, the method begins by zeroing a counter corresponding to each pixel position along the line, step 548.

Now for each image, the method attempts to identify a potential Xleft, a leftmost position for a frame within the image with its top border at line Y, and a potential Xright, a rightmost position for a frame within the image with its top border at line Y.

Referring to FIG. 5 which illustrates this step for a sample image $I_x$, this calculation is performed as follows:

a) Compute the bottom line for the frame according to the height H for the present iteration;
b) Intersect the top and bottom line of the "sliding" frames with the image, obtaining at most four intersection points with their x-values t1, t2, b1, b2.
c) Compute the leftmost $F_L$ and the rightmost $F_R$ valid frame, obtaining two more x-values for the top-left corner, l and r. Thus l will be the rightmost pixel location of the object region R in the image $I_x$ less with frame width W in pixels. Similarly, r will be the leftmost pixel location of the object region R.
d) [XLeft, XRight] will be the intersection of [t1, t2], [b1, b2], [l, r]. (Note that in order to avoid an object region R being too close to a frame boundary [XLeft, XRight] could be set to a fixed number of pixels within the above intersection.)

Now at step 552, the counters initialized at step 548 for the points in the range [XLeft, XRight] are incremented.

If at step 554, the counter for any x location for the candidate horizontal line Y is greater than K, then framing is deemed successful this frame width and height at the chosen frame angle.

If not, then the method continues to the next image, step 556.

If at step 556, there are no more images, then framing has not been successful for the candidate horizontal line and the method continues at the next candidate horizontal line, step 558, until the Y-range of horizontal lines has been traversed.

If all of the candidate horizontal line Y locations have been exhausted without framing, then the frame width is decreased, by half the previous change in frame width as explained above, step 560, and the method repeats.

On the other hand, if at step 554, framing is deemed successful, the method can repeat with an increased candidate frame width, step 562.

During the method of FIG. 7, note can be taken of the images contributing to the framing (or those discarded or not considered) and this can be stored with the image base 120. Nonetheless, it will be appreciated that when traversing a set of source images, knowing the framing including the frame angle, size and location which has been determined for the set of source images, it can be readily determined whether any given image conforms to the determined framing e.g. if the vertices of the frame fall within the image area and if the edges of the frame do not intersect the object region R, and so any such images can be used along with source images which explicitly contributed to determining the framing. Thus, even if a successful framing decision is made before checking all images within a set of source images, it may still be possible to use unchecked images within the set of source images in subsequent processing, for example, in generating the time-lapse sequence.

Also note that, while in the embodiment step 554 occurs at the first successful candidate horizontal line Y, variants of the method could continue to identify further candidate horizontal lines for which framing could be successful, possibly by continuing the process of FIG. 7 for the largest determined framing at a given frame angle. This could enable a more centered location or a location based on another criterion for the object region R within the frame to be identified.

Also, note that the method does not need to traverse the Y range in order from top to bottom. Thus, again for example a binary or similar search strategy could employed to find a successful candidate horizontal line Y.

Also, note that in order to avoid an object region being too close to a frame boundary the Y-range could be reduced by a number of rows at the top and bottom of the range.

In the embodiment described above, the counters between Xleft and Xright are all incremented for a given image. It is also possible just to increment the beginning of the range Xleft with +1 and the first position past the range Xright with −1, as in the following example:

a) Start with 0-initialized counters as shown in Table 1:

TABLE 1

| | Index | | | | | | | | | |
|---|---|---|---|---|---|---|---|---|---|---|
| | 0 | 1 | 2 | 3 | 4 | 5 | 6 | 7 | 8 | 9 |
| Counter Value | 0 | 0 | 0 | 0 | 0 | 0 | 0 | 0 | 0 | 0 | b) For a given image, increment the range [Xleft, Xright] =[1, 4]. The counter will display as in Table 2:

TABLE 2

| | Index | | | | | | | | | |
|---|---|---|---|---|---|---|---|---|---|---|
| | 0 | 1 | 2 | 3 | 4 | 5 | 6 | 7 | 8 | 9 |
| Counter Value | 0 | +1 | 0 | 0 | 0 | −1 | 0 | 0 | 0 | 0 | c) For a subsequent image, increment the range [Xleft, Xright]=[3, 7], as shown in Table 3:

TABLE 3

| | Index | | | | | | | | | |
|---|---|---|---|---|---|---|---|---|---|---|
| | 0 | 1 | 2 | 3 | 4 | 5 | 6 | 7 | 8 | 9 |
| Counter Value | 0 | +1 | 0 | +1 | 0 | −1 | 0 | 0 | −1 | 0 | d) For a subsequent image, increment the range [Xleft, Xright]=[2, 4], as shown in Table 4:

TABLE 4

| | Index | | | | | | | | | |
|---|---|---|---|---|---|---|---|---|---|---|
| | 0 | 1 | 2 | 3 | 4 | 5 | 6 | 7 | 8 | 9 |
| Counter Value | 0 | +1 | +1 | +1 | 0 | −2 | 0 | 0 | −1 | 0 |

At any time, the prefix sums can be computed by summing all the values from the left until the current element to get their real values, as shown in Table 5.

TABLE 5

| | Index | | | | | | | | | |
|---|---|---|---|---|---|---|---|---|---|---|
| | 0 | 1 | 2 | 3 | 4 | 5 | 6 | 7 | 8 | 9 |
| Counter Value | 0 | 1 | 2 | 3 | 3 | 1 | 1 | 1 | 0 | 0 |

If any number exceeds K, then framing has been successful.

It will be appreciated that while the above embodiment has been described in terms of fixing a candidate horizontal line Y and then using a sliding window for the frame along the X axis, as illustrated in FIG. 5, the method could equally be implemented by fixing a vertical line and using a sliding window for the frame along the Y axis.

Also, while the embodiment has been described in terms of fixing an angle within the range of angles and then testing Y and X and positions for a frame at that angle, in variations of the embodiment, Y and/or X positions for a frame could be fixed first and a range of angles tested for those positions subsequently. Although this could involve maintaining several sets of counters, the relative rates of increase of each counter could indicate an angle or sub-range of angles which are more likely to be successful, so enabling these to be completed first in preference to less likely angles.

The above method can have a running time of O(A*log N*log W*H*(N+W)), where:
A=the range of scanning angles
N=the size of the image set
W=an upper bound for the width of all obtained bounding boxes
H=an upper bound for the height of all obtained bounding boxes.

The method does not require advanced data structures, and the most complex operation performed is the intersection of an oriented rectangle with a horizontal line (the step that computes the [XLeft, XRight] range).

The invention claimed is:

1. A method for producing framing information for a set of source images, each comprising an object region, comprising the steps of:
   a) one or more of: scaling, translating and rotating images of said set of N source images so that said object region is aligned within said set of source images;
   b) for a given image of said set of object aligned source images, at a given frame size, a given frame angle for a frame relative to said set of object aligned images and at a first candidate boundary position for said frame, determining if there is at least one position for a second boundary of said frame orthogonal to said first boundary where said frame lies within said image and said frame encloses said object region;
   c) responsive to said determining, incrementing counters associated with said first candidate boundary position for each position for said second boundary where said frame lies within said image and said frame encloses said object region;
   d) responsive to any counter meeting a threshold value, K≤N, for said set of source images, indicating that framing is possible at said given frame size, said frame angle, said first candidate boundary position and any position for said second boundary associated with said threshold meeting counter; and
   e) responsive to no counter meeting said threshold value, K, repeating steps b) to e) for another image of said set of source images.

2. A method according to claim 1 wherein said first boundary is one of a top boundary or a side boundary for a frame and wherein said second boundary is the other of said top boundary or said side boundary.

3. A method according to claim 1 wherein said method is responsive to indicating that framing is possible to increase said given width and to repeat steps b) to e).

4. A method according to claim 1 wherein step e) is responsive to no further images being available to either: reduce said frame size; or change said given angle before repeating steps b) to e).

5. A method according to claim 4 wherein step e) is responsive to no further images, no further frame sizes and no further angles being available to reduce said threshold value K by a fraction f, before repeating steps b) to e).

6. A method according to claim 1 wherein said frame has a fixed aspect ratio.

7. A method according to claim 1 further comprising selecting said frame size using a binary search.

8. A method according to claim 1 wherein said incrementing counters comprises incrementing a counter for a first position for said second boundary of said frame orthogonal to said first boundary where said frame lies within said image and said frame encloses said object region and decrementing a counter after a second position for said second boundary of said frame orthogonal to said first boundary where said frame lies within said image and said frame encloses said object region.

9. A method according to claim 1 wherein said step b) of determining comprises:
- determining a first intersecting portion of said first candidate boundary position for said frame with said given image;
- determining a second intersecting portion of a boundary position for said frame parallel to said first candidate boundary position with said given image;
- determining a first extreme position in a direction parallel to said first candidate boundary of said second boundary for said frame so that said frame encloses said object region; and
- determining a second opposite extreme position in said direction parallel to said first candidate boundary of said second boundary for said frame so that said frame encloses said object region;

wherein said at least one position for a second boundary comprises an intersection of said first intersecting portion, said second intersecting portion and a portion between said first extreme position and said second extreme position.

10. A method according to claim 1 wherein step a) further comprises down-sampling said set of source images.

11. A method according to claim 1 further comprising preparing a time-lapse sequence of at least P≤K framed images based on images from said set of source images each image containing said object region at a common alignment, scale and angle and at a given frame size, frame angle, first candidate boundary position and second boundary position at which framing is determined to be possible.

12. An image processing comprising image processing means arranged for executing the steps of claim 1.

13. A computer program product comprising a non-transitory computer readable medium on which instructions are stored which, when executed on a computer system, are configured for performing the steps of claim 1.

\* \* \* \* \*